J. E. ABRAMS.
MACHINE FOR FORMING CAN BODIES.
APPLICATION FILED AUG. 21, 1908.
949,722.
Patented Feb. 15, 1910.
6 SHEETS—SHEET 2.
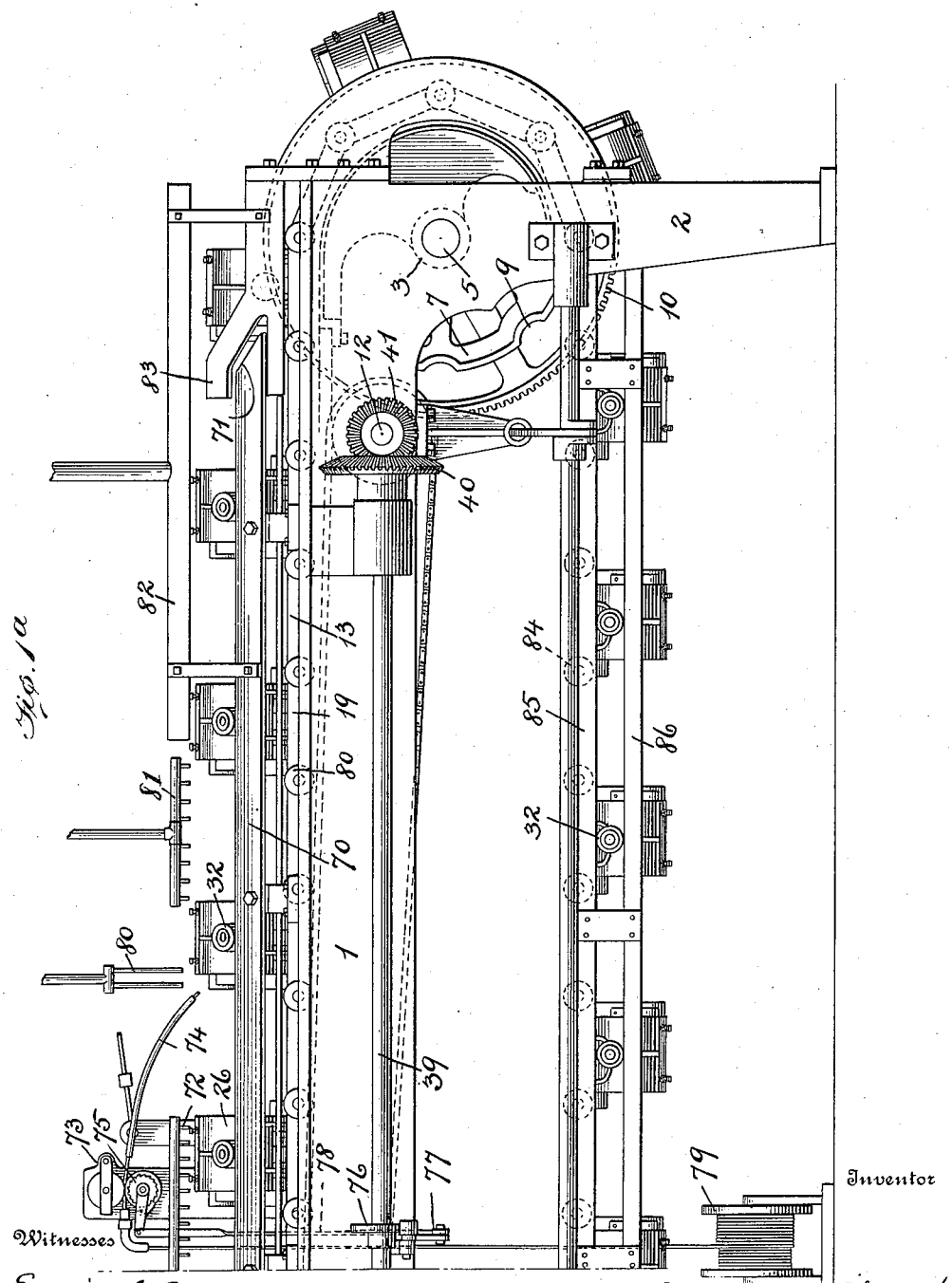

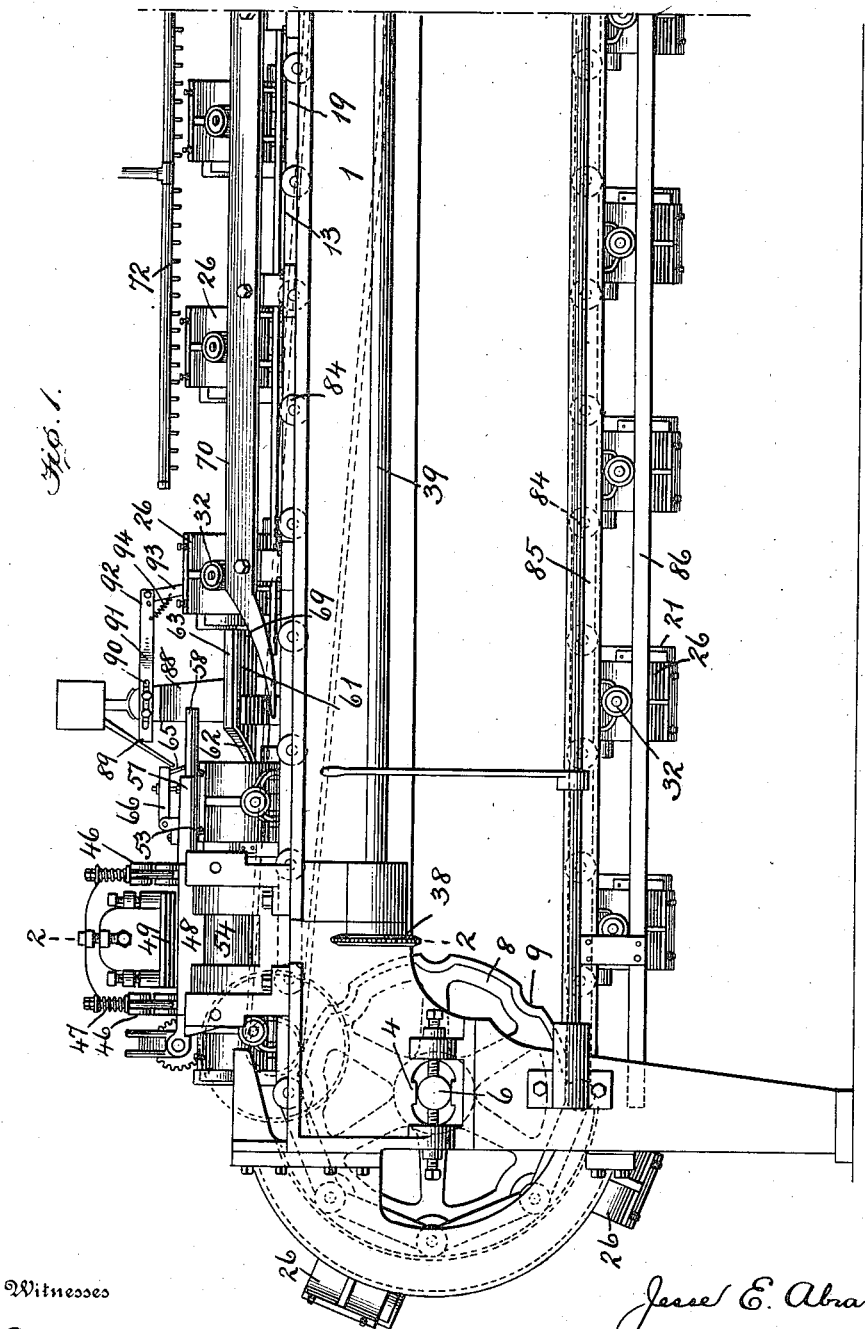

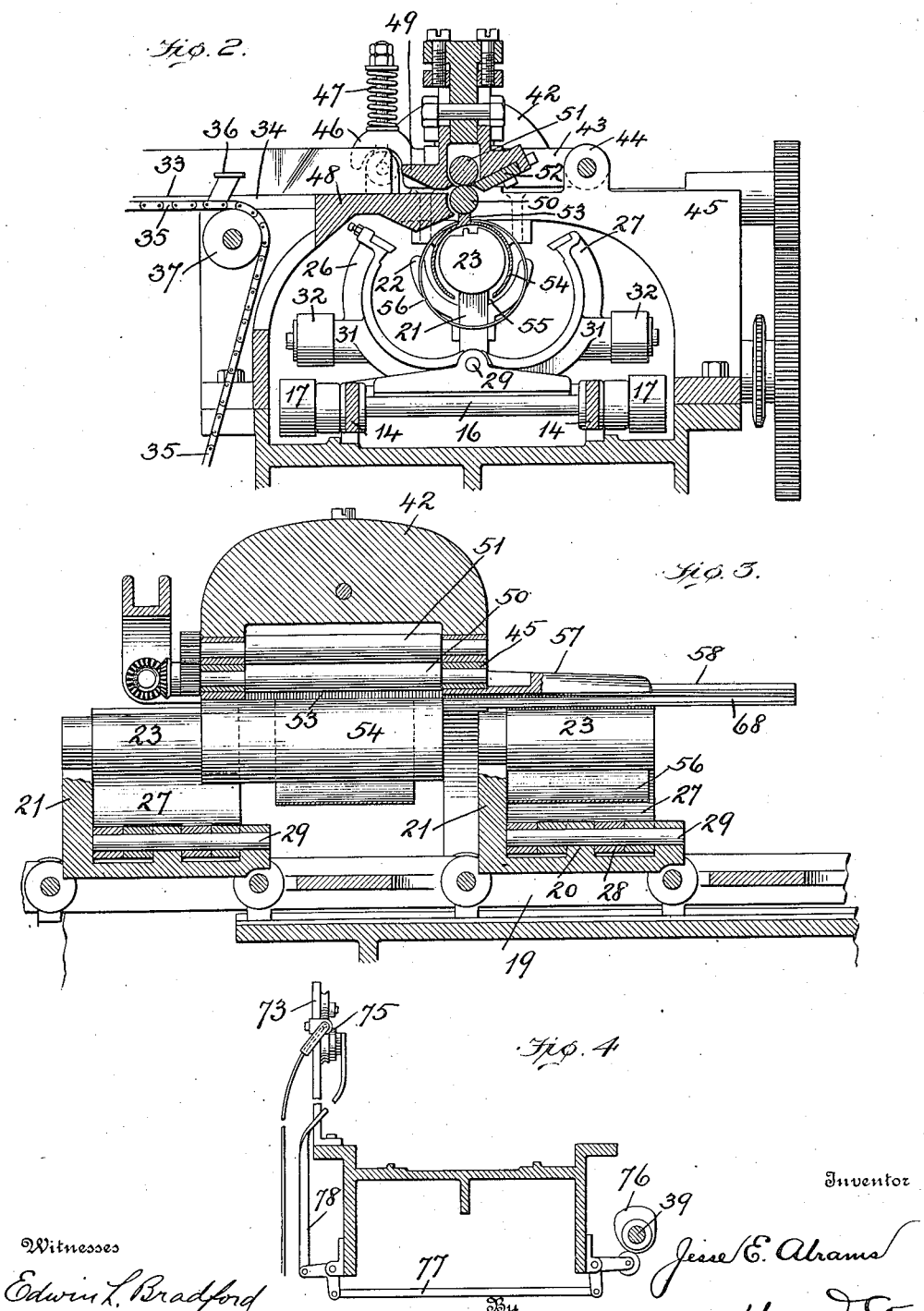

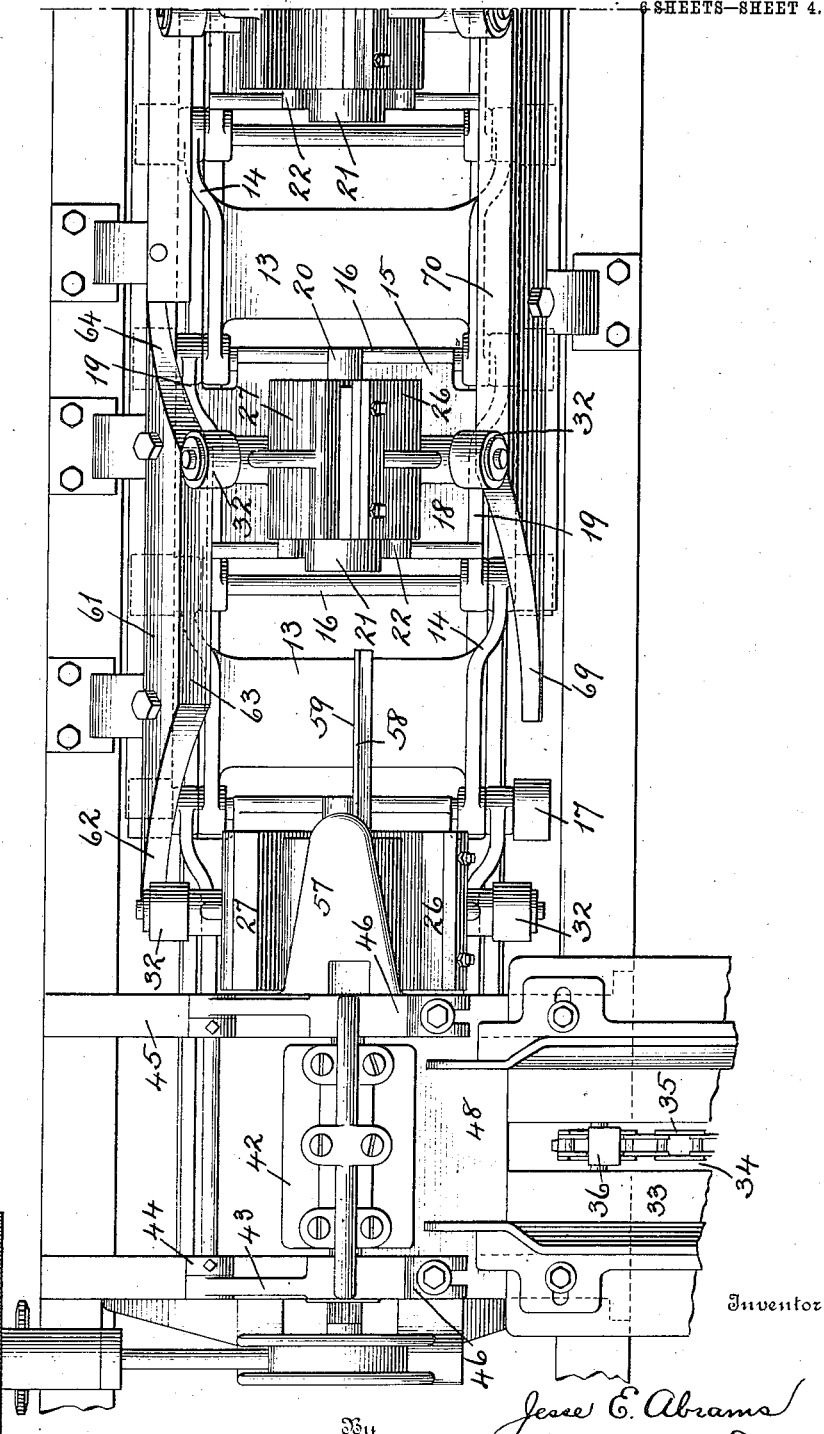

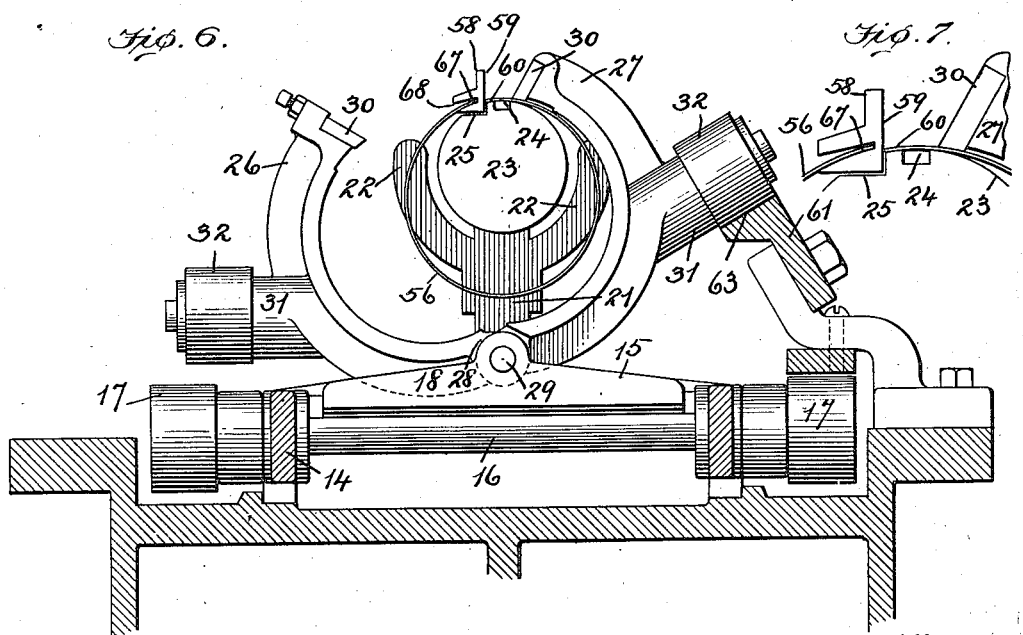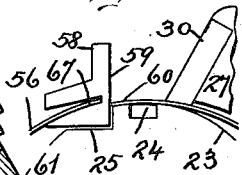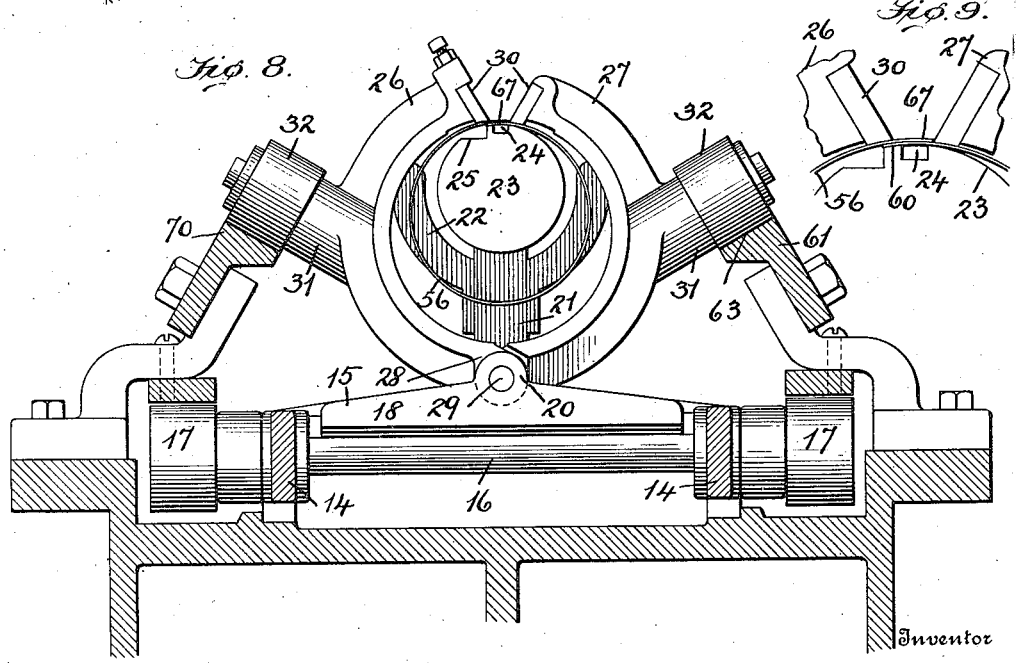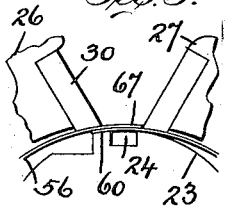

J. E. ABRAMS.
MACHINE FOR FORMING CAN BODIES.
APPLICATION FILED AUG. 21, 1908.
949,722.
Patented Feb. 15, 1910.
6 SHEETS—SHEET 6.
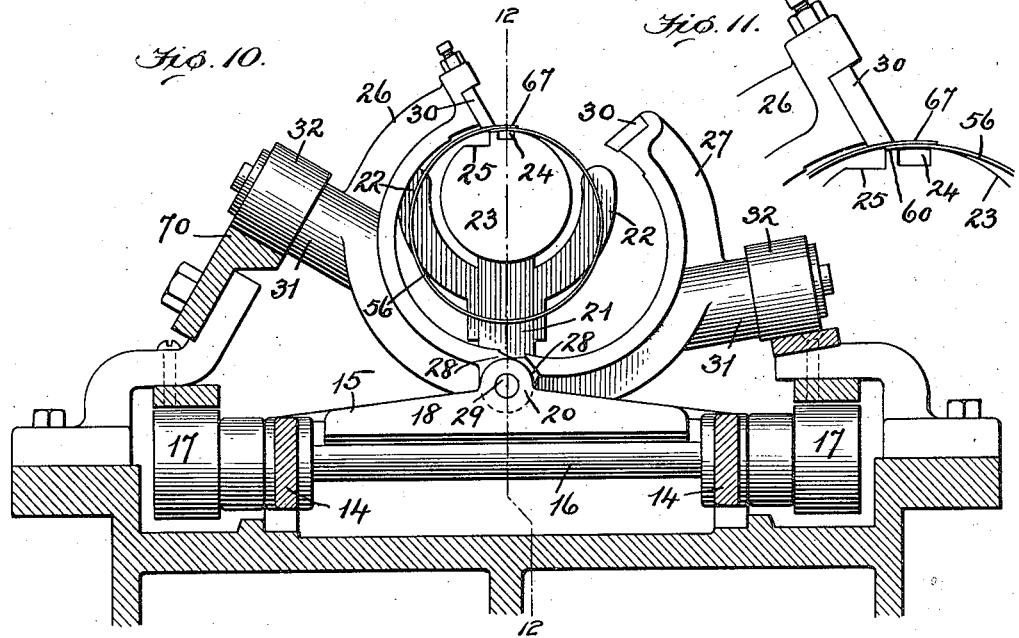
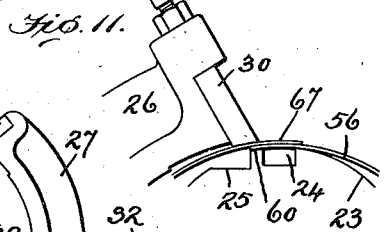
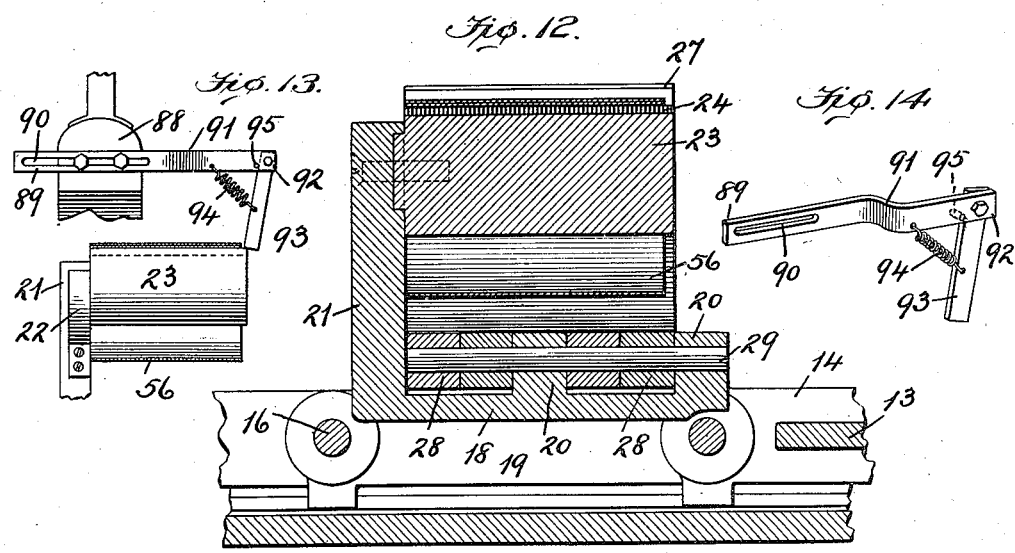
Witnesses
Edwin L. Bradford
G. Ferdinand Vogt
Inventor
Jesse E. Abrams
By Mann & Co.,
Attorneys

UNITED STATES PATENT OFFICE.

JESSE E. ABRAMS, OF BALTIMORE, MARYLAND, ASSIGNOR TO CONTINENTAL CAN COMPANY, OF BALTIMORE, MARYLAND, A CORPORATION OF NEW JERSEY.

MACHINE FOR FORMING CAN-BODIES.

949,722.   Specification of Letters Patent.   Patented Feb. 15, 1910.

Application filed August 21, 1908. Serial No. 449,647.

*To all whom it may concern:*

Be it known that I, JESSE E. ABRAMS, a citizen of the United States, residing at Baltimore, in the State of Maryland, have invented certain new and useful Improvements in Machines for Forming Can-Bodies, of which the following is a specification.

This invention relates to improvements in machines for forming can-bodies and has particular reference to the formation of cylindric bodies having a lapped longitudinal or side seam.

For the purpose of illustration, I have preferred to show my invention applied to a lap seam body-former machine invented by Louis C. Krummel whose application for patent was filed August 24th, 1907, Serial Number 390,026 and in making the said Krummel machine serve to illustrate my invention I have retained his form of body-curling and sustaining mechanism, the endless series of traveling carriages with pivoted clamping jaws, and such other features as have been found to be applicable to my invention, but it is to be understood that my invention may be employed in machines which differ materially in construction from that shown in the said Krummel application.

One object of the invention is to provide novel devices and combinations of devices for sizing the bodies.

Another object is to provide a construction of mechanism whereby bodies of various sizes may be formed without adjustments of any kind.

A further object is to provide a machine that will maintain and always produce a uniform size or width of lap-seam irrespective of the size of the horn or body support, and irrespective of the size of the body when completed.

Another object of the invention is to provide a construction of machine that will enable the fluxing of one of the laps that is to form the seam prior to the lapping of the edges of the body whereby the seam may be fluxed between its laps.

A still further object is to provide a construction of mechanism that will permit each lap to be gaged independently of the other.

Another object is to provide an improved construction whereby the various operations mentioned may be conducted while the body is continuously traveling, and thereby produce a machine of great capacity.

With these and other objects in view the invention is illustrated in the accompanying drawings, in which, Figures 1 and 1ª together show a side elevation of the complete machine with the exception that the blank feeding table and chain operating thereon to convey the blanks have been omitted. Fig. 2 is a vertical cross-sectional view through the blank-feeding mechanism,—the section being taken on the line 2—2 of Fig. 1. Fig. 3 is a longitudinal sectional view through the blank bending devices and shows the curling rolls and the hollow shell on which the curled blank hangs. Fig. 4 shows on a small scale a cross-section through the frame of the machine at one side of the solder feed device. Fig. 5 shows a plan view of the frame at the feed-end of the machine and also shows the cam tracks at the side of the frame for operating the blank-folding jaws. Fig. 6 is a vertical section through the frame immediately in front of one of the horn-supporting carriages and the clamping jaws operating therewith and shows the first step in the operation of gaging one edge of the curled blank. Fig. 7 is an enlarged detail of the jaw and the gaged edge of the blank shown in Fig. 6. Fig. 8 is a vertical section of the parts shown in Fig. 6 but shows the second operation of lapping the edges of the blank and utilizing the one folding jaw as a gage for the overlapping blank edge. Fig. 9 is an enlarged detail of the overlapped blank edges and the two jaws holding the same. Fig. 10 is a vertical cross-section of the parts shown in Figs. 6 and 8 and shows the first jaw in the released position and the overlapped edges of the body held clamped by the other jaw and in readiness for the heating and soldering operations. Fig. 11 is an enlarged detail of the overlapped edges of the body and the single clamp holding the two edges together. Fig. 12 is a vertical longitudinal section through the carriage, the mandrel and the can body folded about the latter,—the section being taken on the line 12—12 of Fig. 10, and Figs. 13 and 14 are details of the pivoted device for gaging the end of the loosely lapped edges of the bodies.

In the drawings the numeral, 1, designates the frame of the machine mounted on suitable legs, 2, and having a stationary bearing, 3, at the discharge end and an adjustable bearing, 4, at the feed-end of the machine. Shafts, 5, and, 6, are mounted horizontally in the said bearings, and said shafts are each provided with a pair of sprocket wheels, 7, and, 8, respectively which sprocket wheels have peripheral pockets, 9, for a purpose presently to be described. A large gear, 10, is also mounted on the horizontal shaft, 3, and meshes with and is driven by a pinion on a horizontal shaft, 12. The horizontal shaft, 12, may be driven in any suitable manner so as to impart rotary movement to the gear and sprockets. An endless chain, 13, extends along the upper side of the machine frame then down over the sprockets and then along the under side of the machine between the legs or supports, 2. This chain comprises a series of links, 14, between which are mounted a plurality of trucks or carriages, 15. The rods, 16, forming the pivots between the links and trucks project at opposite sides of the latter and are provided with rollers, 17, which serve to prevent the raising or dropping of the chain during its travel from one end of the machine to the other and which also seat in the pockets, 9, of the sprocket wheels while the chain is being drawn around by the latter.

It will be understood that the trucks or carriages are spaced apart at regular intervals along the endless chain so as to form an endless series of traveling trucks,—the chain serving to draw the trucks along.

While the driving mechanism here shown will cause the chain and endless series of trucks to travel continuously, and I prefer to carry on the operation in this manner, it is to be understood that the invention is not to be restricted in this respect as it is obvious the chain and trucks could be readily moved intermittently.

The carriages or trucks comprise a base plate, 18, which extends crosswise of the chain between two link bars, 19, and midway between its ends the base plate is provided with hinge eyes, 20. At the rear, each base plate is provided with a post, 21, from opposite sides of which stop or gage arms, 22, project. These arms, during the operation of the machine, serve as a gage against which one end of the cylindric body contacts so as to square up the end as will presently more fully appear. At the upper end the post, 21, carries a solid horn, 23, which is circular in cross-section, and which projects forward from the post and is sustained over the base plate as can be clearly seen in Fig. 12. While the horn is shown and has been referred to as being solid, this expression is to be construed as meaning that the horn is not of the collapsible form and has no movable part and therefore is solid in this sense. In the present instance the horn merely performs the function of a support and in no way operates to size the body from the interior. The upper side of the horn or support is provided with a longitudinal groove, 24, and at one side of the groove the upper side of the horn is provided with a flattened surface, 25, for a purpose presently to be described. At each side of the horn or support are folding clamping jaws, 26, and, 27, which are provided at their lower ends with hinge eyes, 28, that are pivotally mounted on a pintle or rod, 29, extending through the eyes, 20, of the carriage base, as seen in Fig. 12. These folding or clamping jaws are independently movable with respect to each other so that during the operations of the machine either or both of the jaws may be moved on their pivots so as to swing toward or away from the horn or support. The free ends of the jaws are provided with hardened metal plates, 30, which resist wear and which may be renewed when necessary, without disturbing the jaws themselves. The side of each jaw is provided with a lug, 31, which forms a support for a free roller, 32, by means of which the jaws are to be moved toward or away from the horn or support.

From the foregoing description it is to be understood that each truck or carriage supports and conveys a horn and a pair of pivoted clamping jaws, and that the horns and jaws are thus conveyed in an endless series by the traveling conveyer or chain, and that during their travel the jaws are to be operated to effect the lapping and clamping of the lapped seam of the body.

Now presuming the chain and trucks with the horns and clamps to be properly mounted so as to travel from one end of the machine to the other, the first thing to be accomplished is the feeding of the blanks from which the cylindric bodies are to be formed. The particular form of blank feed mechanism is immaterial and as a matter of fact the blanks can be fed directly by hand but in the present instance I have provided a flat horizontal table, 33, which is secured in any suitable manner to the frame of the machine and which is provided with a central longitudinal slot, 34, through which projects a conveyer chain, 35, with properly-spaced propelling fingers, 36, attached thereto which engage one of the end edges of the blank that is laid or fed to the table. The chain conveyer passes around an idler, 37, and is driven by a sprocket, 38, on a horizontal shaft, 39, that in turn is revolved by gears, 40, and, 41, on the main driving shaft, 12, as seen in Fig. 1ª.

Directly beyond the inner end of the table, the machine is provided with a head, 42, which is provided at its far side with arms, 43, that are pivoted to lugs, 44, on brackets, 45, while the near side of the head has arms, 46, which are yieldingly held down by means of bolts and springs, 47. A flat table, 48, is provided between the inner end of the feed table and the head so as to sustain and guide the blank as it passes beneath the head. Above the inner end of the flat table, 48, I provide a downwardly inclined guide plate, 49, which, in case the forward end of a blank is turned or sprung up, will press the same down and guide said forward edge to the roller, 50, which is journaled in the bracket, 45. A roller, 51, is journaled in the head, 42, and has contact with the roller, 50, and the position of this roller with respect to the guide table, 48, is such as to require the sheet or blank to turn upwardly in passing between the two rollers. At the rear of the rollers I provide a deflector plate, 52, which is also carried by the head and the function of this plate is to engage the blank as it passes from between the rollers and turn it downwardly. By thus turning the sheet down as it passes in a curled condition from between the rollers, the initially-curled end, or the end first to pass between the rollers is made to sweep through a circular path and first turn downward and then up under the table, 48, and toward the lower roller, 50. After thus curling the sheets my invention contemplates the employment of some form of device that will then retain the curled sheet with its longitudinal side edges spaced apart, as shown in the said Krummel machine, and to hold the partly formed cylinder in a horizontal plane, as shown in Figs. 2 and 3. By reference to said Figs. 2 and 3 it will be seen that immediately beneath the lower roller, 50, there is provided a stationary bar, 53, which extends longitudinally and in close proximity to said roller. This bar sustains a curved shell or casing, 54, which has a slot or opening, 55, in its lower side. The shell or case is rigid and open at both ends, and the slot in the lower side extends longitudinally from end to end. When the sheet passes from the rollers, 50, and, 51, it curls downward and around the shell or casing until the longitudinal edge that first entered the rolls reaches the side of the bar, 53, next to the table, 48, at which time the other end of the sheet has passed from between the rolls, and as the curl imparted to the sheet, would form a cylinder of less diameter than the diameter of the body when completed, if the edges of the sheet were permitted to come together, the said edges will spring in close contact against and be held apart by the opposite sides of the stationary bar, 53, and thereby clamp said bar and hold the partially-formed cylinder or body, 56, suspended in a central position above the trucks or carriages. While the curled and suspended body is held by the spring action of the metal itself one of the trucks or carriages advances from the rear so that the horn, 23, on the truck will register with and enter the body until the gage-arms, 22, of the post, 21, contact with the rear open end of the suspended body whereupon the body and horn begin their forward travel together. It will be noted that the horn, 23, is of less diameter than the interior of the body, 56, and that the body is neither sized by it nor by the shell, 54. It will also be seen that when the body and horn begin traveling together, the post, 21, of the truck will pass through the slot, 55, of the shell.

By close reference to Figs. 2, 5 and 6, it will be noted that the stationary bar, 53, is not centrally located with respect to the vertical center of the horn but has position slightly to one side of said vertical center. This is desirable for reasons that will presently be fully set forth.

A stationary bracket, 57, is mounted adjacent the end of the stationary shell or casing, 54, and said bracket carries a combined guide and gage-bar, 58, that extends horizontally and parallel with the uppermost surface of the traveling horns. The inner end of this bar abuts against the end of the bar, 53, so that when the traveling horn moves the partly-formed cylinder forward, the spaced-apart edges of the latter may contact with and be guided by the opposite sides of the gage-bar. During this operation the vertical side, 59, of the gage-bar will serve as a gage for the underlapping edge, 60, of the body as clearly shown in Figs. 6 and 7, and said edge of the sheet, as it travels forward will drop directly onto the uppermost surface of the horn, 23, and extend over the longitudinal groove, 24, of the latter. In order that the vertical side, 59, of the gage-bar may properly perform its functions to effect the gaging of the underlapping edge of the body, the same is positioned so as to extend across the said underlapping edge and to enable the horn to pass I have cut the same away at the upper side at the flat surface, 25. It will thus be seen that as the suspended body is carried off the support by the forward movement of the horn the underlapping edge is gaged by the bar, 53, while the other edge is held away, and the next step in the operation must be to secure the gaged-edge in place.

By reference to Figs. 1, 5 and 6 the devices employed to clamp the gage underlapping edge will now be described. At one side of the chain and trucks, the upper surface of the frame, 1, is provided with a cam track, 61, which has first a rise, 62, at one end; a dwell, 63, and then a fall, 64. The position of this cam track is such that the upward-incline rise, 62, is to one side of the gage-bar, 58, so that it will perform its operation while the underlapping edge of the body is traveling at the side of said bar.

As heretofore described the trucks or carriages are provided with clamping jaws which travel with the horns and at one time or another are swung toward and from the horns. When a body is first transferred onto a horn and begins its travel, both of the clamping jaws are in the lowermost position or away from said horns and the rollers, 32, at the side of each jaw has a horizontal position, and the jaws of each truck are movable independently of each other. When, therefore, the curled body has its edges at opposite sides of the guide and gage-bar both jaws are lowered and the roller, 32, on the jaw, 27, has position in line with the cam track, 61, so that as the truck carries the roller, 32, of jaw, 27, onto the rise or upward inclined end, 62, of the cam track the roller will travel up said inclined end and thus close the clamping jaw, 27, up and about the curled body and hold the underlapping edge, 60, of the latter close against the gage-face, 59, and while there clamp it on the horn as seen in Figs. 6 and 7. This jaw, 27, remains in this clamped condition while its roller rides along the dwell or horizontal surface, 62, of the cam track, 61, and after the body has moved beyond the end of the gage-bar.

While the underlapping edge of the body is being gaged and prior to folding the overlapping edge in place I propose to apply flux to said underlapping edge. To accomplish this I provide a pendent flux brush, 65, which is mounted upon an adjustable bracket or bar, 66, so that the flux brush will have position at the side of the gage bar where it can wipe across the underlapping edges of the bodies as the latter travel beneath it. The flux may be contained in a receptacle and conveyed from the latter by a tube and deposited drop by drop on the flux brush, 65, as clearly seen in Fig. 1.

During the gaging, clamping, and fluxing of the underlapping edge, the overlapping edge, 67, of the body at the opposite side of the bar, 58, is guided in a grooved race, 68, see Fig. 6, and said edge is maintained in a plane slightly above the underlapping edge so that as the overlapping edge passes off the end of the guide bar it will be in position to pass over the fluxed underlapping edge without liability of catching.

While the overlapping edge, 67, is passing off the end of the guide-bar the roller, 32, on the clamping jaw, 26, begins to travel up the inclined end, 69, of a cam track, 70, so as to swing said jaw, 26, up toward the body and to thus close the overlapping edge over and on top of the clamped and fluxed underlapping edge. In performing this operation it will be seen by reference to Figs. 8 and 9, that the clamp, 27, being previously clamped and remaining in the clamped position, will now serve as a gage for the overlapping edge, 67, so that the clamp, 26, will press the edge, 67, over on top of the edge, 60, and against the face of the other clamp. It will also be seen that the overlapping clamp when finally in place will press the overlapping edge down on the underlapping edge and thus said clamp, 26, will hold both edges of the body and will continue to hold the same until the soldered body is to be discharged.

From the foregoing description it will be observed that the horn has performed no function other than to serve as a support and carrier for the body and that the underlapping edge of the body was first gaged by the stationary gage while the overlapping edge is gaged by the traveling clamp, 27, which forms a preliminary clamp for the underlapping edge. The size of the completed body is therefore determined, in the present instance by the length of the blank and not by the size of the horn. The result and advantage of this construction are that the machine, without material change can be made to produce bodies of various diameters.

While the overlapping clamp, 26, is being swung up to fold the overlapping edge, I have found it desirable to provide a device, which by contact with the end of the body will push or press the same back toward the horn-sustaining post, 21, and against the end gage arms, 22, and thereby insure that the opposite ends of the lapped edges will register so that one end will not project beyond the other.

By reference to Figs. 1, 13 and 14 it will be seen that a bracket, 88, which is employed to sustain the flux receptacle is also utilized to sustain a horizontal bar, 89, having an adjusting slot, 90, at one end. This bar has an outward bend, 91, between its ends so that its unsupported projecting end, 92, may have position over the center of the traveling horns. A downwardly-projecting finger, 93, is carried at the end of the horizontal bar, 89, and its lower end has position where it may contact with the forward end of the curled bodies and press them rearwardly on the horn and back against the gage arms, 22, and the lower end of said finger is yieldingly held toward the rear by means of a spring, 94. A pin, 95, on the bar, 89, serves as a stop to limit the rearward movement of the finger. It will thus be seen that as the horns on which the bodies are supported, travel beneath the finger, 93, the lower end thereof will strike against the ends of the lapped edges just prior to the locking action of the clamp, 26, so that before the clamp presses the two edges of the body together the finger will have caused the ends of the lapped edges to properly register, and immediately thereafter the clamp engages and holds the lapped edges together.

By reference to Fig. 5 it will be seen that as soon as the clamp, 26, operates to clamp the two lapped edges, the roller, 32, of the clamp, 27, will begin to travel down the inclined end or fall of the cam track, 64, and thus release the underlapping gage-clamp, 27, so as to leave the body on the horn with but one clamp, 26, in place as clearly shown in Figs. 10 and 11. The body remains clamped by the single jaw, 26, throughout the operations of pre-heating, soldering, reheating and cooling and is only released when the roller of the clamp, 26, reaches the downwardly-inclined end, 71, of the cam track, 70, which may be seen in Fig. 1ª.

After the dropping away of the clamp-jaw, 27, the truck will be conveyed so as to expose the fluxed, lapped and clamped edges of the body to the action of heat from a series of burners, 72, which extend in a horizontal direction above the trucks and preliminarily heat the lap seam and prepare it to receive the solder.

The groove or channel, 24, in the horn beneath the lapped seam is productive of good results in that it heats the seam more uniformly, being out of contact with the horn and it further aids in quickly cooling the seam after the soldering and reheating operations.

After the preliminary heating, the bodies are conveyed past a solder feed mechanism, 73, of any suitable form but which in the present instance operates to feed a strip of solder through a tube, 74, by means of a pawl and ratchet device, 75, and to deposit said solder directly on the longitudinal seam. This pawl and ratchet mechanism is intermittently operated by means of a cam, 76, on the horizontal shaft, 39, which imparts a reciprocating movement to rods, 77, and, 78, and thus draws the solder from a spool, 79. The solder is practically in a molten condition when it contacts with the seam for the reason that the flames from burners, 80, play directly upon it as it discharges from said tube and as the body is traveling during this operation the solder is thus thoroughly distributed over the seam. The solder applied body may then be passed beneath a wiper as is common to remove surplus solder. In the next step of the soldering operation the body with the solder applied is passed beneath a series of burners, 81, where the reheating of the solder and seam will cause the solder to sweat into the joint between the lapped edges which was fluxed before the edges were lapped. After this reheating operation the trucks carry the clamped soldered body beneath a long tube, 82, from which jets of air are blown onto the seam to effect a prompt cooling of the latter, and finally the clamp jaw, 26, is released by the roller traveling down the incline end, 71, of the cam track, being assisted in this releasing operation by means of an overhanging rail, 83, in case the clamp should stick and the releasing of the clamp enables the soldered body to drop from the end of the horn. After the bodies have been discharged, the trucks and chain travel down and under the sprocket wheels, 7, and the rollers, 84, of the chain by traveling on horizontal rails, 85, will hold the trucks and chain up and prevent sagging of the latter, while the rollers, 32, of the clamps will ride on the rails, 86, and prevent the clamp jaws from swinging while returning to the feed-end of the machine.

It will be understood that the clamping jaw, 27, serves first to hold the underlapping edge of the body in its gaged position and then acts as a gage for the overlapping edge of the body and upon gaging said latter edge the said jaw then moves away as in the meantime the jaw, 26, has clamped the overlapping edge down on top of the underlapping edge. It will also be seen that both edges of the body are independently gaged and that the width of the lap is always the same irrespective of the size of the body or of the size of the horn. It will further be seen that the horns may be utilized no matter what size of body is to be produced and as a matter of fact no adjustment or alteration in the machine is necessary to form the lap seam of a body of any size within the range of the machine.

It is to be understood that while the drawings and specification illustrate and describe the bodies as being cylindrical in form, the body may be square or other shape in cross-section.

Having thus described my invention what I claim and desire to secure by Letters Patent is,—

1. In a can-body forming and lap-seaming machine the combination with means for sustaining the body in a curled condition, of means for clamping the body near one edge and setting a gage for the unclamped opposite edge of said body, means for moving the unclamped edge of the body against the set gage, and means for soldering the edges of the body.

2. In a can-body forming and lap-seaming machine the combination with means for sustaining a curled body, of a clamp for engaging one edge of said body said clamp also serving as a gage for the unclamped edge; means for folding said unclamped edge of the body over the clamped edge and against said gage said latter means clamping both edges and means for soldering the said lapped and clamped edges.

3. In a can-body forming and lap-seaming machine the combination with means for sustaining a curled body, of means for clamping the body to one side of its edge and leaving said edge exposed; means operating on the unclamped edge of the body to lap it over the previously exposed edge; means for holding said latter means in the operated position to hold the edges lapped, and means for soldering the lapped edges.

4. In a can-body lap-seaming machine the combination with means for sustaining a curled body, of means for clamping the body adjacent one of its edges, means for moving the unclamped edge on top of the gaged edge; means for gaging said latter edge; means for clamping the lapped edges and means for soldering said lapped edges.

5. In a lap-seam can-body machine the combination with a series of traveling horns each for sustaining a curled body, of means for gaging the underlapping edge of each body while on its individual horn; means adjacent the path of the traveling horns for fluxing the outer surface of the underlapping edge of each can body as the horn travels, means for placing the overlapping edge against the outer fluxed surface of the underlapping edge as the horns and bodies advance and means for soldering the lapped edges.

6. In a can-body seaming machine the combination with means for sustaining the curled body, of a stationary gage for the underlapping edge of the body, a movable gage for the overlapping edge of the body means for advancing the body-sustaining means from the stationary gage, means operative beyond said stationary gage for bringing the overlapping edge against the movable gage, and means for soldering the lapped edges.

7. In a can-body seaming machine the combination with means for sustaining the curled body, of a gage for the underlapping edge of the body, a clamp operating on said underlapping edge,—said clamp forming a gage for the overlapping edge, means for positioning the overlapping edge against the clamp-gage and the underlapping edge, means for clamping the overlapping edge against the underlapping edge, means for retracting the gage-clamp and means for soldering the lapped edges.

8. In a can-body seaming machine the combination with a traveling body support for sustaining the body in a curled condition, of means for gaging the underlapping edge of the body, means traveling with the support for gaging the overlapping edge of the body, means also traveling with the support for clamping the gaged and lapped edges, and means for soldering the edges.

9. In a can-body seaming machine the combination with a traveling horn, of means independent of the horn for gaging the underlapping edge of the body, means traveling with the horn for gaging the overlapping edge of the body independently of the horn, means traveling with the horn for clamping the edges lapped, means for moving the overlapping edge gage away from the body, and means for soldering the lapped edges.

10. In a can-body seaming machine the combination with an endless series of body carrying horns of a stationary gage for the underlapping edges of the bodies on the various horns, a gage traveling with each horn for gaging the overlapping edge of the body on the horn with which it travels, a clamp also for each horn for holding the edges lapped, and means for soldering the lapped edges successively.

11. In a can-body seaming machine the combination with means for sustaining the bodies in a curled condition, of a series of traveling horns movable successively into the sustained bodies, means for clamping the underlapping edge of the body, means for folding the overlapping edge of the body against the underlapping edge and gaging said overlapping edge to size the body by the edge gaging thereof and means for soldering said edges.

12. In a can-body seaming machine the combination with a series of movable horns, of means for rolling a blank into a cylindric body and delivering it onto a horn, means for gaging one edge of the body, means for lapping and independently gaging the opposite edge of the body, means for holding the lapped edges gaged and means for soldering said edges.

13. In a can-body seaming machine the combination with a series of traveling horns, of means for rolling blanks into cylindric bodies and delivering them successively to the horns, means for gaging one edge of the body, means for clamping said gaged edge, means traveling with each body and horn for lapping the unclamped edge over the clamped edge and against the clamp of the latter, and means for soldering the lapped edges.

14. In a can-body seaming machine the combination with a series of traveling horns, of means for rolling blanks into cylindric bodies and delivering them successively to the horns, a gage for gaging one edge of all the bodies on all the horns, independent gages traveling with each horn for gaging the opposite edge of each body, means for lapping and clamping the lapped edges and means for soldering the lapped edges.

15. In a can-body seaming machine the combination with a series of traveling horns, of means for rolling blanks into cylindric bodies and delivering them successively to the horns, a stationary gage for gaging one edge of all the bodies, means for clamping said gaged edge and forming a gage for the opposite edge of the body,—said means traveling with the horns, and means also traveling with the horns and clamping the gaged edges, and means for soldering the said edges.

16. In a can-body seaming machine the combination with means for successively rolling blanks into cylindric bodies and holding the same suspended, of a series of traveling trucks, a horn on each of said trucks,— said horns being movable into the suspended bodies in succession, clamping jaws on each truck, means for operating one of said jaws to gage the underlapping edge of the body on the horn, means for gaging the overlapping edge of the body, means for holding said lapped edges in the gaged position and means for soldering the said edges.

17. In a can-body seaming machine the combination with means for sustaining a curled body, of a series of traveling trucks, clamping jaws mounted on and moving with the trucks, a horn also sustained from each truck to receive the bodies, means for operating one of the jaws to gage one edge of the body, means for operating the other jaw to lap and gage the opposite edge of the body, means for retracting the first gage to leave the lapped edges exposed, and means for soldering said edges.

18. In a can-body seaming machine the combination with means for sustaining a curled body of a series of traveling trucks, clamping jaws mounted on said trucks, a horn also mounted on each truck, means for operating one jaw to gage one edge of the body, means for fluxing said edge, means for operating the other jaw to lap and gage the opposite edge of the body and fold it against the fluxed edge, and means for soldering said lapped edges.

19. In a can-body seaming machine the combination with means for rolling a blank into a cylindric body, of a series of traveling horns, clamping jaws for each horn, a stationary gage means for first operating one jaw to gage the underlapping edge of the body, means for operating the other jaw to fold the opposite edge of the body against the first clamp, means for retracting the first clamp and means for soldering the gaged and clamped edges.

20. In a can-body forming and seaming machine the combination with means for sustaining a curled body, of means for clamping the body and leaving the underlapping edge exposed; means for fluxing said underlapping edge; means operating on the opposite edge of the body to effect the lapping of the edges, means for gaging the lapped edges endwise and means for soldering said edges.

21. In a can-body forming and seaming machine the combination with means for sustaining a curled body, of means for gaging one edge of the body, means for fluxing said edge, means for gaging the other edge of the body, means for gaging the ends of the two edges and bringing them into register, means for clamping the lapped and gaged edges, and means for soldering said edges.

In testimony whereof I affix my signature in presence of two witnesses.

JESSE E. ABRAMS.

Witnesses:
G. FERDINAND VOGT,
CHARLES B. MANN, Jr.